United States Patent
Waldman et al.

(10) Patent No.: US 9,675,059 B2
(45) Date of Patent: Jun. 13, 2017

(54) RODENT DETERRENT APPARATUS

(71) Applicant: Renee Yvonne Waldman, Cave Creek, AZ (US)

(72) Inventors: Renee Yvonne Waldman, Cave Creek, AZ (US); Charles A. Neal, Cave Creek, AZ (US); Mickey Perreaud, Cave Creek, AZ (US)

( * ) Notice: Subject to any disclaimer, the term of this patent is extended or adjusted under 35 U.S.C. 154(b) by 0 days.

(21) Appl. No.: 15/230,986

(22) Filed: Aug. 8, 2016

(65) Prior Publication Data
US 2016/0338337 A1  Nov. 24, 2016

Related U.S. Application Data

(63) Continuation-in-part of application No. 13/740,559, filed on Jan. 14, 2013, now abandoned.

(60) Provisional application No. 61/615,208, filed on Mar. 24, 2012.

(51) Int. Cl.
| | |
|---|---|
| A01M 29/10 | (2011.01) |
| A01M 29/12 | (2011.01) |
| A01M 29/18 | (2011.01) |
| F21V 23/04 | (2006.01) |
| A01M 29/16 | (2011.01) |
| A01M 31/00 | (2006.01) |
| F21Y 115/10 | (2016.01) |
| G08C 17/02 | (2006.01) |

(52) U.S. Cl.
CPC ............ *A01M 29/10* (2013.01); *A01M 29/12* (2013.01); *A01M 29/16* (2013.01); *A01M 29/18* (2013.01); *A01M 31/002* (2013.01); *F21V 23/0407* (2013.01); *F21V 23/0464* (2013.01); *F21V 23/0471* (2013.01); *F21V 23/0492* (2013.01); *F21Y 2115/10* (2016.08); *G08C 17/02* (2013.01)

(58) Field of Classification Search
CPC .... A01M 31/002; A01M 29/10; A01M 29/16; A01M 29/12; A01M 29/18; F21Y 2115/10; G08C 17/02; F21S 48/215; Y02E 60/12; F21V 23/0442; F21V 23/0471; F21V 23/0407; F21V 23/0492; F21V 23/0464
See application file for complete search history.

(56) References Cited

U.S. PATENT DOCUMENTS

| | | | |
|---|---|---|---|
| 5,777,551 A | 7/1998 | Hess | |
| 2005/0206525 A1* | 9/2005 | Weilbacher, Jr. ... | A01M 31/002 340/573.2 |
| 2006/0077663 A1 | 4/2006 | De Ginto et al. | |
| 2006/0174533 A1* | 8/2006 | Rusciano .............. | A01M 29/10 43/1 |
| 2007/0035394 A1 | 2/2007 | Houston | |

(Continued)

*Primary Examiner* — An T Nguyen
(74) *Attorney, Agent, or Firm* — Invention to Patent Services; Alex Hobson

(57) ABSTRACT

A rodent deterrent apparatus has one or more deterrent features including a deterring light feature, a deterring sound feature and/or a deterring scent feature. A selection feature allows a user to select one or more of the deterring features to be activated. A motion detector may activate the deterring feature or features when motion is detected near the rodent deterrent apparatus. An accelerometer detects when the rodent deterrent apparatus is in motion and a controller may switch the apparatus to a power saver mode, wherein the deterrent features are not activated during motion, in order to save power.

19 Claims, 7 Drawing Sheets

(56) References Cited

U.S. PATENT DOCUMENTS

| | | | |
|---|---|---|---|
| 2007/0133206 A1* | 6/2007 | Demarest | A01M 1/2072 |
| | | | 362/253 |
| 2007/0204804 A1 | 9/2007 | Swanson et al. | |
| 2008/0156279 A1 | 7/2008 | Weiser et al. | |
| 2009/0034369 A1 | 2/2009 | Hill | |
| 2009/0073694 A1* | 3/2009 | Scannell, Jr. | A47G 7/06 |
| | | | 362/253 |
| 2011/0061605 A1 | 3/2011 | Hardi et al. | |
| 2011/0246124 A1 | 10/2011 | Lill et al. | |
| 2011/0273860 A1* | 11/2011 | Corvese | B41J 3/36 |
| | | | 361/816 |
| 2011/0316680 A1* | 12/2011 | Heininger | B60Q 1/1423 |
| | | | 340/425.5 |

\* cited by examiner

RODENT DETERRENT APPARATUS

CROSS REFERENCE TO RELATED APPLICATIONS

This application is a continuation in part of U.S. patent application Ser. No. 13/740,559, filed on Jan. 14, 2013, which claims the benefit of U.S. Provisional Patent Application No. 61/615,208, filed on Mar. 24, 2012, the entirety of both are hereby incorporated by reference herein.

BACKGROUND OF THE INVENTION

Field of the Invention

The present invention generally relates to a rodent deterrent apparatus. Specifically, this invention relates to an apparatus that is easily attachable to one or more surfaces in an area where rodents frequently nest unwantedly and works to deter the rodents from nesting in those areas.

Background

The presence of rodents and other pests is a concern of property owners everywhere. More specifically, rodents and other pests can carry and spread disease and other unwanted filth that is undesirable. To deal with this issue, a number of systems and methods currently exist, including poisons, repellents, and traps. The currently available solutions, however, do have drawbacks. First, many of the methods are lethal, killing the rodent or other pest. This can have detrimental effects on the local ecosystem by exposing other animals to the poisons and traps or by reducing the food supply for the animals that prey on the rodents and other pests. Additionally, currently available pest solutions are primarily intended for temporary placement and/or disposable use, which is not an optimal use of resources.

Therefore, there is a need in the art for rodent deterrent apparatus that helps prevent rodent and pest activity in a non-lethal manner and is durable for repeated use and/or permanent placement. These and other features and advantages of the present invention will be explained and will become obvious to one skilled in the art through the summary of the invention that follows.

SUMMARY OF THE INVENTION

The invention is directed to a rodent deterrent apparatus comprising one or more deterrent features that may be selectively activated/deactivated by a user selection feature and by input from an accelerometer and/or a motion detector. A deterring feature may be a light deterring feature, such as a light or a strobe light having a pulse frequency of 1 to 5 seconds, for example, a sound deterring feature that may emit an ultrasonic sound, and a scent deterring feature that emits or releases a deterring scent.

Accordingly, it is an object of the present invention to provide an apparatus for curtailing rodent activity whereby a deterring means on the apparatus deters rodent nesting and associated activities.

According to an embodiment of the present invention, a rodent deterrent apparatus including a deterrent apparatus controller, including one or more deterrent feature, a control element, and a power source, wherein the power source is configured to provide power to the one or more deterrent feature and the control element, wherein the control element is configured to selectively activate the one more deterrent feature, and a main housing, wherein the main housing is configured to retain the deterrent apparatus controller.

According to an embodiment of the present invention, the rodent deterrent apparatus further includes one or more attachment feature.

According to an embodiment of the present invention, the one or more attachment is comprised of a group of attachment feature including magnets, adhesives, hook-and-loop fasters, and clips.

According to an embodiment of the present invention, the one or more deterrent feature are selected from a group including a light source, an audio source, and an ultrasonic source.

According to an embodiment of the present invention, the light source is a light-emitting diode (LED) light.

According to an embodiment of the present invention, the power source is a battery.

According to an embodiment of the present invention, the power source is an alternating current (AC) adapter.

According to an embodiment of the present invention, the power source is a direct current (DC) adapter.

According to an embodiment of the present invention, the power source is a photovoltaic panel.

According to an embodiment of the present invention, the deterrent apparatus controller further includes an accelerometer.

According to an embodiment of the present invention, the main housing is comprised of a water and shock resistant material suitable for outdoor use.

According to an embodiment of the present invention, the main housing is sealed to protect the deterrent apparatus controller from external elements.

According to an embodiment of the present invention, the rodent deterrent apparatus further includes a sensor operably connected to the control element, wherein the sensor is configured to detect rodents and upon sensing a rodent sends a signal to the control element, wherein the signal causes the control element to engage one or more of the one or more deterrent feature.

According to an embodiment of the present invention, the sensor is a motion sensor.

According to an embodiment of the present invention, the control element is a printed circuit board.

According to an embodiment of the present invention, the rodent deterrent apparatus further includes a status indicator operably connected to the control element, wherein the status indicator is configured to convey information about one or more components of the rodent deterrent apparatus.

In an exemplary embodiment, a rodent deterrent apparatus comprises at least one deterring feature selected from, a light deterring feature, a sound deterring feature and a scent deterring feature. An exemplary rodent deterrent apparatus may comprise a light deterring feature, a sound deterring feature and a scent deterring feature. A selection feature may allow a user to select which of the deterring features can be activated by the controller. For example, a user may select only the light deterring feature and the other deterring features may be deactivated. An exemplary deterrent apparatus may comprise a motion detector or sensor that detects motion, such as a rodent, around the main housing. The motion detector may detect motion within a range of about 20 cm, about 40 cm, about 60 cm, about 80 cm, about 1 m or more, or any range between and including the distances provided. The deterring features may be activated when the motion detector detects motion. In an alternative embodiment, the deterring features may be periodically activated as controlled by the controller wherein the deterring apparatus are turned on for an activation time and then turned off for a down time. An activation time may be about 5 second or more, about 10 second or more, about 30 second or more, about 1 minute or more and any range between and including the activation times provided. A down time, or interval between activation times, may be about 10 second or more, about 30 seconds or more, about 1 minute of more, about 5 minutes or more, about 10 minutes or more and any range between and including the down times provided.

An exemplary rodent deterring apparatus may comprise an accelerometer to detect when the rodent deterring apparatus is in motion, such as when a vehicle it is attached to is moving. The controller may receive input from the accelerometer that the apparatus is moving and then switch the apparatus to a power saver mode, wherein the deterring apparatus and/or the motion detector are deactivated until the apparatus stops moving. All non-essential elements may be powered off in a power saver mode until motion ceases for a threshold period of time, or delay time. There may be a delay time for reactivating the rodent deterrent apparatus after the vehicle stops moving, such as at least about 5 minutes, at least about 10 minutes, at least about 20 minutes, at least about 30 minutes and any range between and including the delay times provided. This delay time may prevent the apparatus from turning on when the vehicle is stopped temporarily, such as at a traffic light or when stopped in traffic.

An exemplary rodent deterring apparatus may comprise a light sensor to detect when the rodent deterring apparatus is in an illuminated area, such as when parked outdoors during the day. The light sensor may detect a level of ambient light and may send a signal to the controller when the ambient light level, or light level around the rodent deterrent apparatus, is above a threshold value, or may send the light level to the controller that determines if it is above a threshold value. The controller may receive input from the light sensor that the apparatus is in an illuminated environment, or above a light threshold level, and switch the apparatus to a power saver mode, wherein the deterring apparatus are deactivated until the apparatus is in a dark environment, such as at nighttime, or when parked in an enclosure such as a garage. A light deterring setting feature may enable a person to change the intensity of the light output from the light deterring feature light, or the pulse interval of a strobe light.

A light deterring feature may comprise one or more lights that may flash or strobe to deter rodents from an area proximal the rodent deterrent apparatus. In an exemplary embodiment, the light deterring feature comprises a strobe light that has a pulse interval of between about 1 and 10 seconds, or between about 1 and 5 seconds, or between 0.1 and 5 second or between 0.2 and 2 seconds, for example. The light deterring feature may comprise a light emitting diode (LED), light, or a plurality of LED lights. The lights may be configured in multiple locations on the rodent deterring apparatus.

A sound deterring feature may comprise a speaker or sound emitting device that emits a deterring sound. The sound emitted may be an ultrasonic sound, or ultrasonic waves, that is not audible by humans but is audible by rodents. The sound deterring feature may emit a deterring sound continuously or in intervals, wherein there is a silent time and a sound emitting time. The sound emitting time may be about 5 seconds or more, about 10 second or more, about 30 seconds or more, about 1 minute or more and any range between and including the sound emitting times provided. The silent time interval may be about 5 seconds or more, about 10 second or more, about 30 seconds or more, about 1 minute or more, about 5 minutes or more, about 10 minutes or more and any range between and including the sound emitting times provided. The silent time duration may be longer than the sound emitting time. The silent time may be selected to ensure rodents do not have enough time to enter and damage a vehicle or objects in an area before they are deterred by the emitted sound.

A scent deterrent feature is configured to release a scent that rodents to not like and will avoid. An exemplary scent deterrent feature comprises a scent reservoir for receiving a scent element, such as a scent liquid, a puck, pouch, or package. The scent may be released from the scent element from a scent outlet, such as apertures in the scent reservoir cover. In an exemplary embodiment, a scent heating element is configured to heat the scent element within the scent reservoir to release scent from the apparatus.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
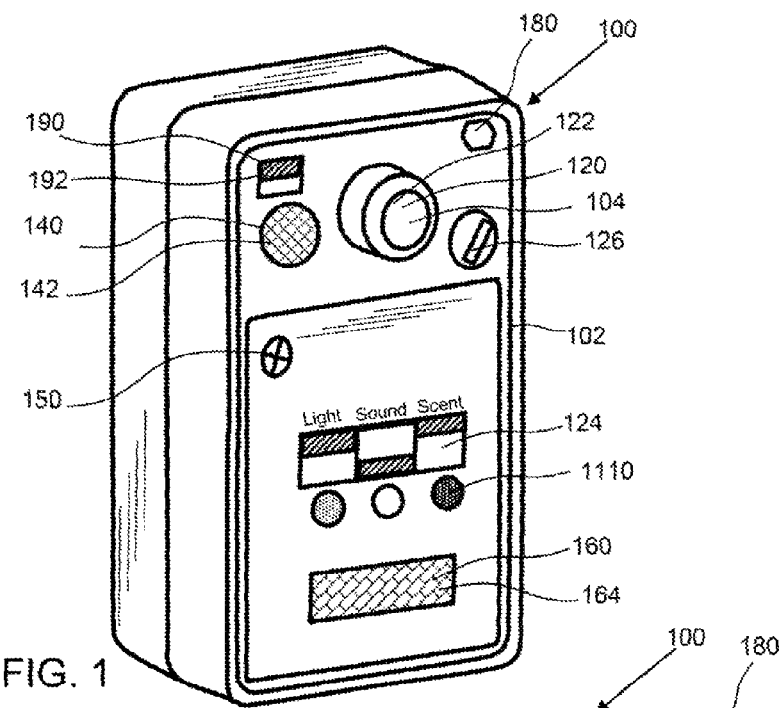
FIG. 1 is a perspective view of a rodent deterrent apparatus, in accordance with an embodiment of the present invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

The present invention generally relates to rodent deterrent apparatus. Specifically, this invention relates to an apparatus that is easily attachable to one or more surfaces in an area were rodents frequently nest unwantedly and works to deter the rodents from nesting in those areas. In general, the apparatus is comprised of a main housing, an attachment feature, a power source and a deterrent feature.

According to an embodiment of the present invention, the rodent deterrent apparatus is comprised of deterrent apparatus controller and a main housing. Optionally, the rodent deterrent apparatus may include additional components, including, but not limited to an attachment feature, a sensor, a status indicator, or any combination thereof. One of ordinary skill in the art would appreciate that there are numerous components that could be included with the present invention, and embodiments of the present invention are contemplated for use with any such sensor.

According to an embodiment of the present invention, the rodent deterrent apparatus is comprised of deterrent apparatus controller. In a preferred embodiment, the deterrent apparatus controller is comprised of a deterrent feature, a control element, and a power source. In an alternate embodiment, the deterrent apparatus controller may further include an accelerometer. One of ordinary skill in the art would appreciate that the deterrent apparatus controller could be configured with additional components, and embodiments of the present invention are contemplated for use with any such components.

According to an embodiment of the present invention, the deterrent apparatus controller is comprised of one or more deterrent feature. Deterrent feature include, but are not limited to, light sources, audio sources, ultrasonic sources or any combination thereof. In a preferred embodiment, the deterrent feature is a delayed strobe light with a delay between 1 and 5 seconds between pulses. The strobe light may be a small light emitting diode (LED) light or other similar strobe light with low power requirements to allow for extended use and minimal power drain on the power source. One of ordinary skill in the art would appreciate that there are numerous other types of light sources and delays that could be utilized with embodiments of the present invention, and embodiments of the present invention are contemplated for use with any type of light source and delay. Further, one of ordinary skill in the art would appreciate there are numerous types of deterrent feature that could be utilized with embodiments of the present invention, and embodiments of the present invention are contemplated for use with any type of deterrent feature.

According to an embodiment of the present invention, the deterrent apparatus controller is comprised of a control element. In a preferred embodiment, the control element is a printed circuit board (PCB). One of ordinary skill in the art would appreciate that there are control elements that could be utilized with embodiments of the present invention, and embodiments of the present invention are contemplated for use with any type of control element.

According to an embodiment of the present invention, the control element is a logic control that coordinates the functions of the other components of the deterrent apparatus controller. In the preferred embodiment, the control element regulates the interaction of the deterrent feature and the power source to selectively activate the deterrent feature. The control element activates the deterrent feature by allowing the deterrent feature to receive power from the power source. Alternatively, the control element deactivates the deterrent feature by blocking the deterrent feature from the power source. In the preferred embodiment, the control element may be programmed to activate and deactivate the deterrent feature according to a programmed timer or delay. Alternatively, the control element may be programmed to respond to input from a sensor to activate and deactivate the deterrent feature. One of ordinary skill in the art would appreciate that the control element could regulate any number of components, and embodiments of the present invention are contemplated for use with any such component. Further, one of ordinary skill in the art would appreciate the control element could be governed by a variety of programs and inputs, and embodiments of the present invention are contemplated for use with any such program or input.

According to an embodiment of the present invention, the deterrent apparatus controller is comprised of a power source. The power source is configured to provide power to the control elements, deterrent feature and other elements of the apparatus that may require power in order to function. The power source may be, for instance, alligator clips configured to be attached to a battery (e.g., vehicle battery), one or more batteries, an AC adapter, a DC adapter, a renewable power source (e.g., wind turbine, solar panel). One of ordinary skill in the art would appreciate that there are numerous power sources that may be utilized with embodiments of the present invention, and embodiments of the present invention are contemplated for use with any power source.

According to an embodiment of the present invention, the deterrent apparatus controller is comprised of an accelerometer. In a preferred embodiment, the accelerometer detects when the rodent deterrent apparatus is in motion, such as when the apparatus is attached to a vehicle, so that the entire rodent deterrent apparatus can be powered off to reduce drain on the power source. One of ordinary skill in the art would appreciate that there are numerous accelerometers that may be utilized with embodiments of the present invention, and embodiments of the present invention are contemplated for use with any accelerometer.

According to an embodiment of the present invention, the main housing of the rodent deterrent apparatus is configured to house and protect the deterrent apparatus controller and other components of the rodent deterrent apparatus. In a preferred embodiment, the main housing is comprised of a weather resistant and shock resistant material appropriate for use in outdoor environments. For instance, the main housing may be comprised of a durable plastic material which is both water and shock resistant. One of ordinary skill in the art would appreciate that there are numerous materials from which the main housing could be constructed, and embodiments of the present invention are contemplated for use with main housings constructed from any material.

In certain embodiments, the main housing may be sealed in a manner to protect the components housed therein from external elements including, but not limited to, water, ice, snow, dirt and other corrosive materials. For instance, the housing may be formed from two pieces (a top piece and a bottom piece) with the two pieces being sealed together with an O-ring or other flexible sealing membrane. In embodiments where certain components (e.g., power source components, deterrent components) extend to a location exterior to the main housing, those channels or through-holes may be sealed as well by similar means. One of ordinary skill in the art would appreciate there are numerous ways to provide sealing of a housing, and embodiments of the present invention are contemplated for use with any method for sealing a housing.

According to an embodiment of the present invention, the rodent deterrent apparatus is comprised of an attachment feature. While this element may be optional, preferred embodiments of the present invention are comprised of an attachment feature that secures to a side (i.e., rear, bottom, side, front, and top) of the apparatus and is configured to secure the entire apparatus to a surface of the area to be protected by the apparatus. Attachment feature include, but are not limited to, magnets, adhesives, epoxies, Velcro attachments, zip ties and clips. One of ordinary skill in the art would appreciate that there are numerous attachment feature that may be utilized with embodiments of the present invention, and embodiments of the present invention are contemplated for use with any attachment feature.

According to an embodiment of the present invention, the rodent deterrent apparatus is comprised of a sensor. In a preferred embodiment, the sensor is a motion sensor that is operably connected to the control element of the deterrent apparatus controller. The motion sensor would allow the rodent deterrent apparatus to sense the presence of rodent and signal the control element to activate the deterrent feature. One of ordinary skill in the art would appreciate that there are numerous sensors that may be utilized with embodiments of the present invention, and embodiments of the present invention are contemplated for use with any such sensor.

According to an embodiment of the present invention, the rodent deterrent apparatus is comprised of a status indicator. In a preferred embodiment the status indicator is operably connected to the control element of the deterrent apparatus controller and signals the operational status of rodent deterrent apparatus or its components. As an illustrative example, the status indicator could indicate the power level of a battery or other power source. In an alternative example, the status indicator could indicate the function of an ultrasonic deterrent feature that would otherwise be inaudible to a person. In a final example, that status indicator could be useful to convey information about the functionality of the rodent deterrent apparatus when the apparatus is mounted in location that is difficult to access. One of ordinary skill in the art would appreciate that there are numerous functions that may be performed by a status indicator, and embodiments of the present invention are contemplated for use with any such function.

Embodiments of the present invention are configured for use in a multitude of locations. Appropriate and useful locations include, inside the engine compartment or other area of a vehicle (e.g., car, truck, watercraft, boat, trailer, recreational vehicle), inside a barbeque grill or other outdoor cooking area frequented by rodents, under decks, under gazebos or anywhere else rodents frequently choose to nest. One of ordinary skill in the art would appreciate that there are numerous locations where the apparatus could be utilized, and embodiments of the present invention are contemplated for use in any location.

Exemplary Embodiments

Turning now to FIG. 1, a perspective view of a rodent deterrent apparatus 100, in accordance with an embodiment of the present invention. In a preferred embodiment, the rodent deterrent apparatus is primarily comprised of a main housing 102 and deterrent feature 104. In this embodiment, a rectangular main housing 102 is utilized with a deterrent feature 104 comprised of a light deterrent 120. The light deterrent is a strobe light 122, which may comprise an LED light which blinks on and off and has a pulse interval, or time between the light blinking or flashing on of 1-5 seconds. A light deterrent setting feature 126 enables a user to set the intensity of the light, and/or the pulse interval of a strobe light type light deterrent. A sound deterrent 140 comprises a speaker 142 that may emit a deterring sound, such as an ultrasonic sound, or sound having a frequency that is in the ultrasonic range, which may be referred to as an ultrasonic wave. The sound may not be audible by humans but may deter animals such as rodents. A scent deterrent 160 comprises a reservoir 164 for receiving scent, such as a liquid or puck or capsule, for example. A cover may extend over the scent reservoir and have apertures for releasing the scent from the scent reservoir. A heater may be configured to increase the release of scent from the scent reservoir. A selection feature 124 having a plurality of switches or buttons is configured to allow a user to select which of the deterrent features, light, sound or scent, they want activated. As shown, the light and scent features are activated and the sound deterrent is disabled by the selection feature. A status indicator 1110 shows the status of each of the deterrent features, or means. As shown, the light deterrent feature is activated and a green light indicates that it is working properly. The sound deterrent feature is disabled and the status indicator light is off. The scent feature is activated but has a status indicator light showing a problem with the device, such as a red light to indicate that the scent reservoir is empty, for example. A motion sensor 180 is configured to detect when a rodent is near the rodent deterrent apparatus 100 and one or more of the deterrent features may be activated when the motion sensor or detector detects motion. For example, the light and sound deterrents may be activated when the motion detector detects motion and these deterrent features may remain activated for an activation time and then be deactivated by the controller. An accelerometer 190 is configured with a switch 192 to activate or deactivate the accelerometer function of the apparatus. When the accelerometer feature is activated, the deterrent features will be turned off, or deactivated when the rodent deterrent apparatus is in motion, as detected by the accelerometer. A person may choose to locate the rodent deterrent apparatus in a stationary location, such as a laundry room, and may choose to deactivate the accelerometer feature. A light sensor 150 is configured on the rodent deterrent apparatus 100 to detect a level of light. The controller may put the apparatus in a power saver mode, when the light sensor detects a light level above a threshold value. The apparatus may be turned to a power saver mode when parked outdoors during the daytime, for example. The power source, such as batteries, is contained within the main housing 102 and the entire main housing 102 is sealed and protected from external elements.

Figures 2, 3:
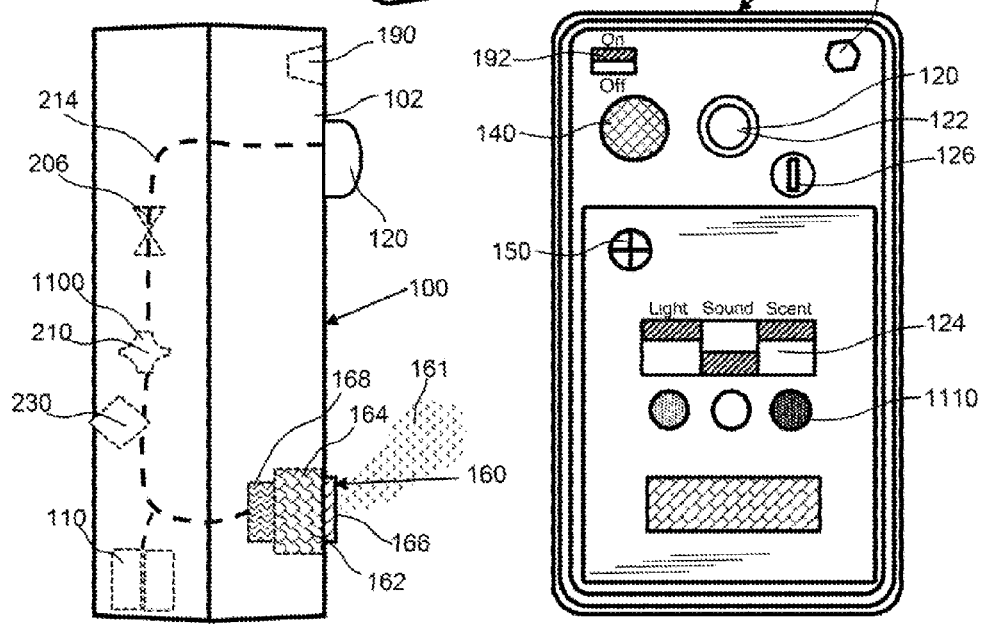
FIG. 2 is a side view of a rodent deterrent apparatus, in accordance with an embodiment of the present invention.
FIG. 3 is a front view of a rodent deterrent apparatus, in accordance with an embodiment of the present invention.
Figure 4:
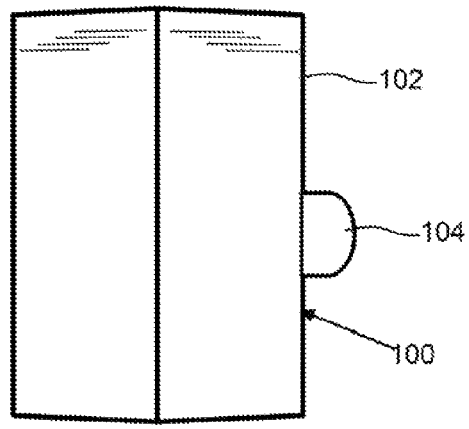
FIG. 4 is a top view of a rodent deterrent apparatus, in accordance with an embodiment of the present invention.
Figure 5:
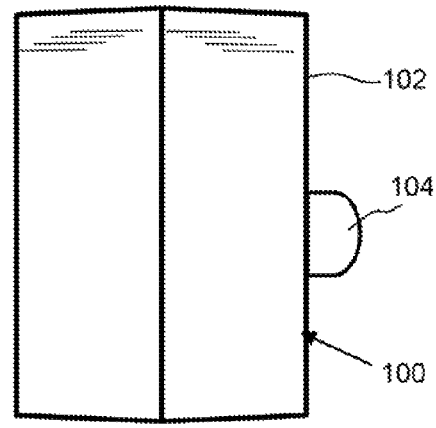
FIG. 5 is a bottom view of a rodent deterrent apparatus, in accordance with an embodiment of the present invention.
Figure 13:
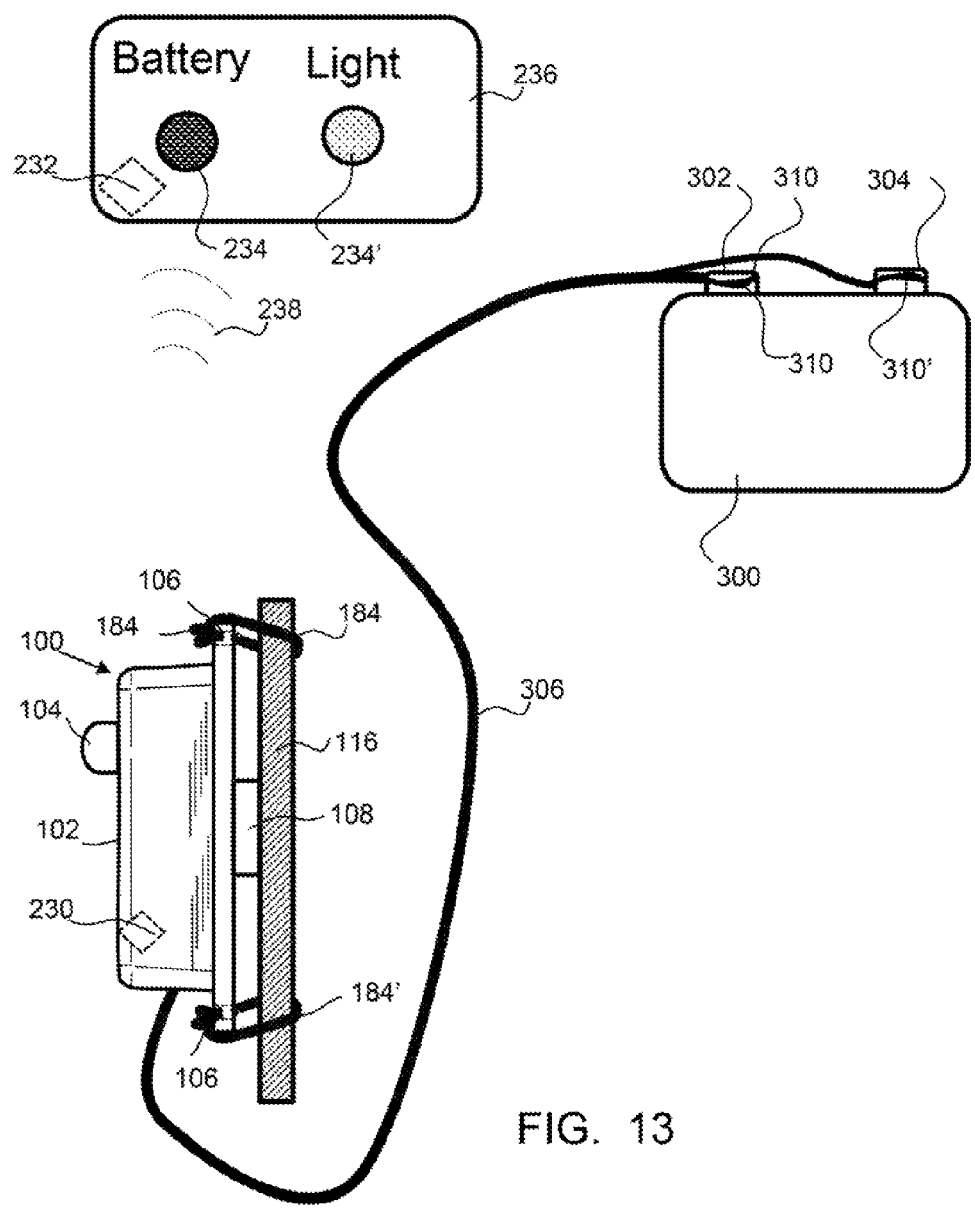
FIG. 13 shows an exemplary rodent deterrent apparatus attached to a vehicle and a power cord attached to the battery of the vehicle.

Turning now to FIGS. 2-5, an exemplary embodiment of the present invention is shown. FIG. 2 is a side view of a rodent deterrent apparatus, in accordance with an embodiment of the present invention. As shown in FIG. 2, the exemplary controller 1100 comprises a microprocessor 210 a control circuit 214 having switches 206 to control the power to and from the deterrent features and sensors. A wireless signal transmitter 230 is configured to send and receive signals regarding the operation of the pest deterrent apparatus, including battery level, deterrent function and the like. For example, a pest deterrent apparatus may be placed under the hood of an automobile and a wireless receiver, as shown in FIG. 13 may receive a wireless signal to indicate functions of the pest deterrent apparatus. A red indication light may illuminate on the wireless receiver when the battery is below a preset threshold as monitored by the controller. Likewise, if the strobe light burns out or is not functioning properly, an indication light may illuminate to indicate a replacement is need. The power source, or batteries, in this embodiment, provide power to the controller which comprises a control program for operating the system. FIG. 3 is a front view of a rodent deterrent apparatus, in accordance with an embodiment of the present invention. FIG. 4 is a top view of a rodent deterrent apparatus, in accordance with an embodiment of the present invention. FIG. 5 is a bottom view of a rodent deterrent apparatus, in accordance with an embodiment of the present invention. In this embodiment, a rectangular main housing 102 is utilized with a deterrent feature 104 comprised of a LED light which blinks on a 1-5 second delay. The power source of this embodiment is contained within the main housing 102 and the entire main housing 102 is sealed and protected from external elements. An exemplary scent deterrent 160 comprises a scent reservoir 164 for receiving and retaining a scent element 162, such as a scent liquid or scent sponge, puck, or package, and a scent heating element 168. The scent heating element heats the scent element within the scent reservoir to release a deterring scent 161 though the scent outlet 166, or apertures in a s scent reservoir cover, for example.

Uses for the above described embodiment include installation in outdoor barbecue units to discourage pack rats and other rodents/vermin from building nests, rummaging through or otherwise visiting barbecue units. The low voltage LED (deterrent feature) provides low battery drain, allowing for the internal battery source to last for extended periods of time, making it convenient as replacing or recharging the power source can be done very infrequently.

Figure 6:
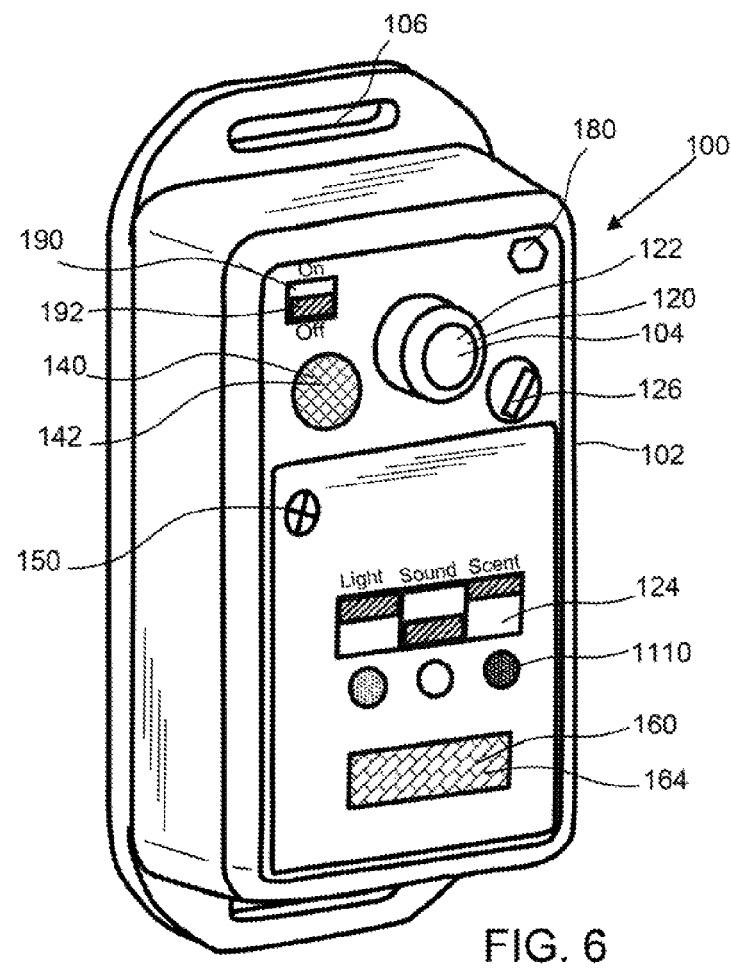
FIG. 6 is a perspective view of a rodent deterrent apparatus, in accordance with an embodiment of the present invention.

Turning now to FIG. 6, a perspective view of a rodent deterrent apparatus 100, in accordance with an embodiment of the present invention. In a preferred embodiment, the rodent deterrent apparatus is primarily comprised of a main housing 102, deterrent feature 104, and a first attachment feature 106. In this embodiment, a rectangular main housing 102 is utilized with a deterrent feature 104 comprised of a light deterrent 120, such as a strobe light 122. The strobe light may comprise a LED light which blinks on a 1-5 second delay or pulse time. The power source of this embodiment is contained within the main housing 102 and the entire main housing 102 is sealed and protected from external elements. In this embodiment, the main housing 102 further includes a first attachment feature 106, which may be used to attach the rodent deterrent apparatus 100 to another object. The first attachment feature 106 can be used to attach the rodent deterrent apparatus 100 with a variety of securing features or fasteners, including, but not limited to, screws, bolts, nails, rivets, zip-ties, straps or ties or any combination thereof. The first attachment feature is a slot or aperture that allows a securing fastener to extend through the aperture to secure the rodent deterrent apparatus to another object, such as to a vehicle.

Figure 7:
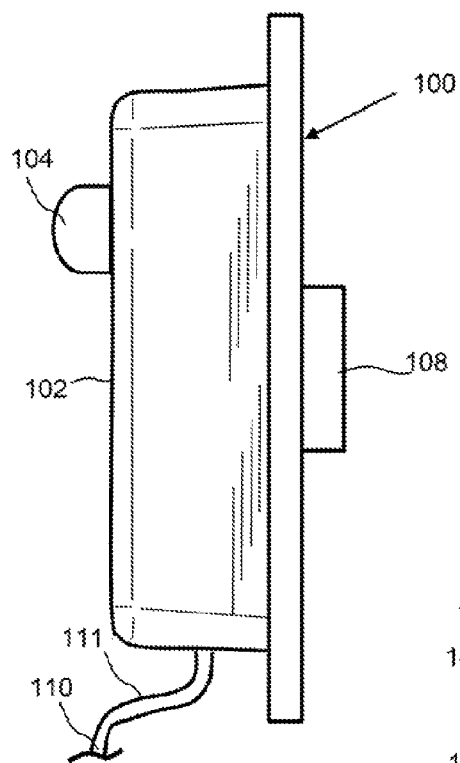
FIG. 7 is a side view of a rodent deterrent apparatus, in accordance with an embodiment of the present invention.

Turning now to FIG. 7, a side view of a rodent deterrent apparatus, in accordance with an embodiment of the present invention. In a preferred embodiment, the rodent deterrent apparatus is primarily comprised of a main housing 102, deterrent feature 104, a second attachment feature 108, and a power source 110. In this embodiment, a rectangular main housing 102 is utilized with a deterrent feature 104 comprised of a LED light which blinks on a 1-5 second delay. The power source 110 of this embodiment is external to the main housing 102 and might include a battery, an AC adapter, a DC adapter, a photovoltaic panel, or any combination thereof. As shown the power source comprises a power cord 111, that extends from the rodent deterrent apparatus to a power supply, not shown. The entire main housing 102 is sealed and protected from external elements. In this embodiment, the main housing 102 further includes a second attachment feature 108, which in this embodiment is a magnet, but may also include, but is not limited to, a clip mechanism or snapping means.

Figure 8:
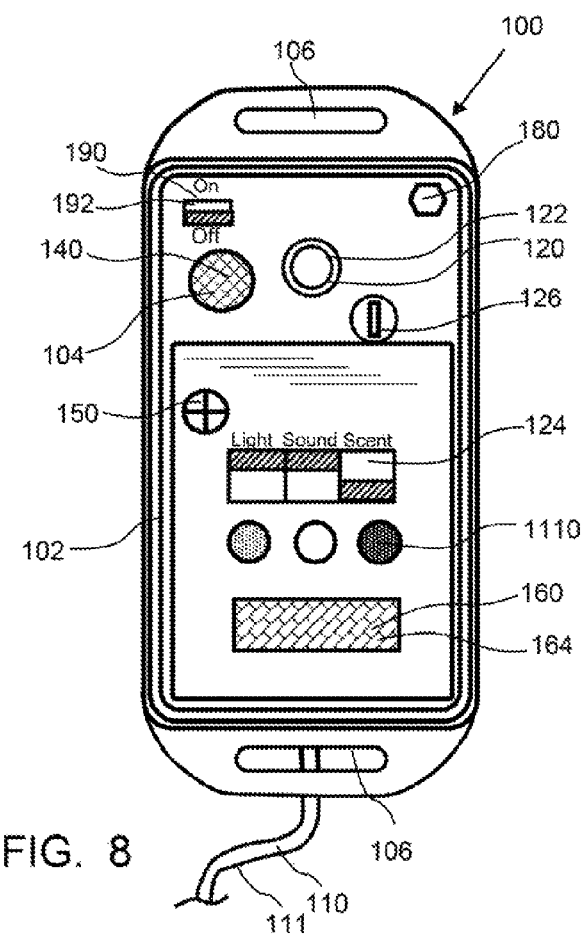
FIG. 8 is a front view of a rodent deterrent apparatus, in accordance with an embodiment of the present invention.

Turning now to FIG. 8, a top view of a rodent deterrent apparatus 100, in accordance with an embodiment of the present invention. In a preferred embodiment, the rodent deterrent apparatus is primarily comprised of a main housing 102, deterrent feature 104, a first attachment feature 106, and a power source 110. In this embodiment, a rectangular main housing 102 is utilized with a deterrent feature 104 comprised of a LED light which blinks on a 1-5 second delay. The power source 110 of this embodiment is external to the main housing 102 and might include, but is not limited to, a battery, an AC adapter, a DC adapter, a photovoltaic panel, a power outlet or any combination thereof. The power source 110 comprises a power cord 111 to deliver power to the main housing 102. In this embodiment, the main housing 102 further includes a first attachment feature 106, which may be used to attach the rodent deterrent apparatus 100 to another object. The first attachment feature 106 can be used to attach the rodent deterrent apparatus 100 with a variety of securing features, including, but not limited to, screws, bolts, nails, rivets, zip-ties, or any combination thereof. As shown in FIG. 8, the light and sound deterrent features are turned on by the selection feature 124 and the scent deterrent is deactivated. The accelerometer 190 is turned off, or deactivated by the accelerometer switch 192.

Figure 9:
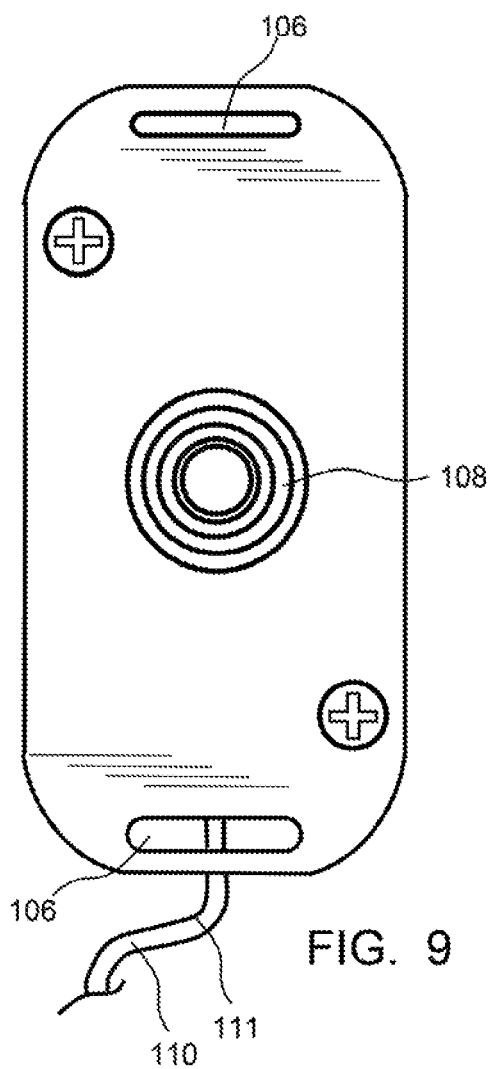
FIG. 9 is a back view of a rodent deterrent apparatus, in accordance with an embodiment of the present invention.

Turning now to FIG. 9, a back view of a rodent deterrent apparatus 100, in accordance with an embodiment of the present invention. In a preferred embodiment, the rodent deterrent apparatus is primarily comprised of a main housing 102, a first attachment feature 106, a second attachment feature 108, and a power source 110. The entire main housing 102 is sealed and protected from external elements. In this embodiment, the main housing 102 includes a first attachment feature 106, which may be used to attach the rodent deterrent apparatus 100 to another object. The first attachment feature 106 can be used to attach the rodent deterrent apparatus 100 with a variety of securing features, including, but not limited to, screws, bolts, nails, rivets, zip-ties, straps or ties or any combination thereof. This embodiment of the rodent deterrent apparatus 100 further includes a second attachment feature 108, which in this embodiment is a magnet, but may also include, but is not limited to, a clip mechanism or snapping means. The power source 110 of this embodiment is external to the main housing 102 and power is provided through the power cord 111 and might include a battery, an AC adapter, a DC adapter, a photovoltaic panel, a power outlet or any combination thereof.

Figure 10:
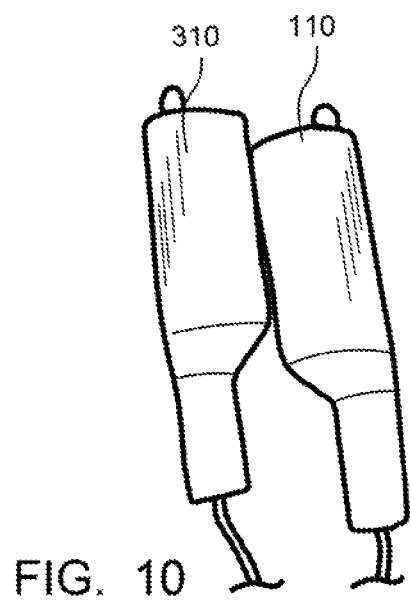
FIG. 10 is a perspective of a power source for a rodent deterrent apparatus, in accordance with an embodiment of the present invention.

Turning now to FIG. 10, a front view of a power source 110 for a rodent deterrent apparatus, in accordance with an embodiment of the present invention. In this embodiment, the power source is a set of alligator clips configured to be attached to a battery or other electrical source, such as to the battery of a vehicle. Uses for the above described embodiments include installation in the engine compartment of a vehicle. The deterrent features are designed to discourage pack rats and other rodents/vermin from building nests, rummaging through or otherwise entering the engine compartment of a vehicle. The deterrent features may be configured to provide low battery drain, allowing the power source to be clipped to a battery of the vehicle and provide long lasting use for the apparatus, especially when the vehicle is used, even infrequently, and allowed to have the alternator of the vehicle recharge the battery to which the power source is attached. In this manner, the apparatus can allow nearly perpetual usage without replacement.

Figure 11:
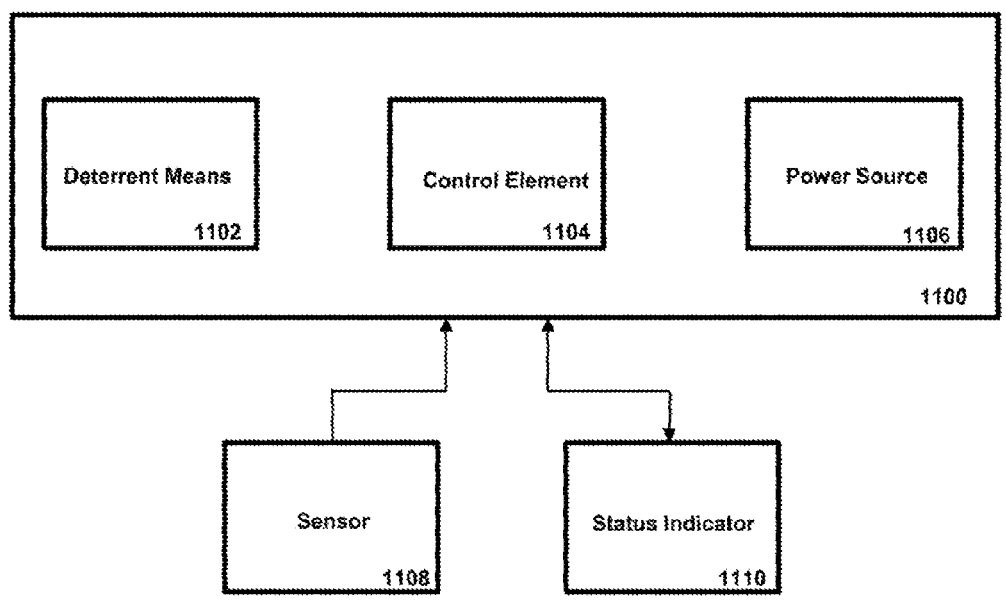
FIG. 11 is a schematic overview of a rodent deterrent apparatus with optional components, in accordance with an exemplary embodiment on the present invention.

Turning now to FIG. 11, a schematic overview of a rodent deterrent apparatus with optional components, in accordance with an exemplary embodiment of the present invention is shown. In this embodiment, the rodent deterrent apparatus is comprised of a deterrent apparatus controller 1100 and the optional components of a sensor 1108, such as a motion and/or accelerometer, and a status indicator 1110. The deterrent apparatus controller 1100 is further comprised of at least one deterrent feature 1102, a control element 1104, such as a microprocessor and/or a circuit and switches, and a power source 1106.

Figure 12:
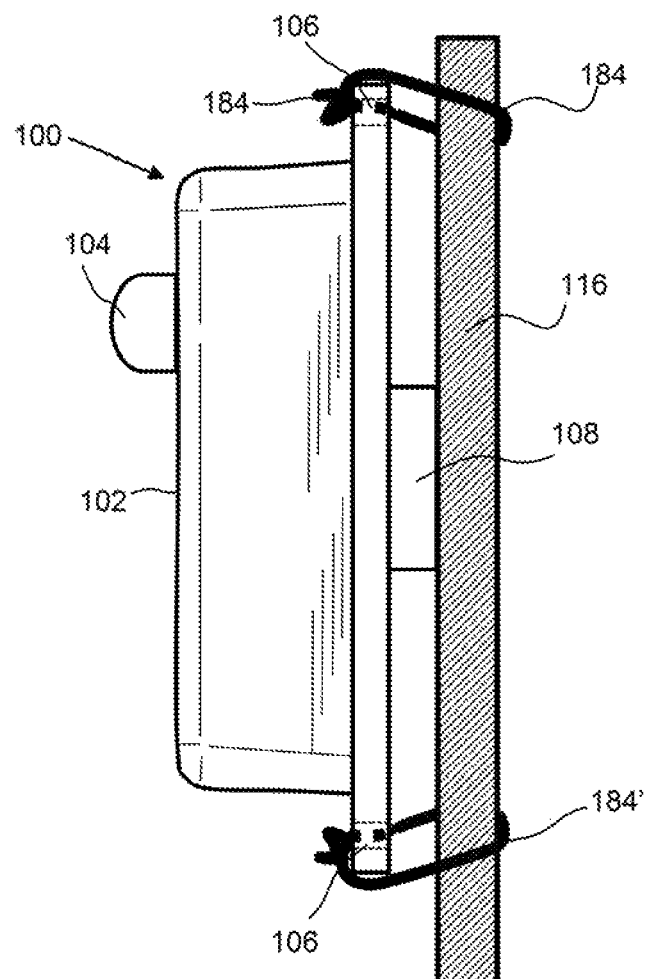
FIG. 12 is a side view of an exemplary rodent deterrent apparatus attached to a vehicle.

As shown in FIGS. 12 and 13, an exemplary rodent deterrent apparatus 100 is detachably attached to an object, such as a vehicle 116. The two first attachment features 106, 106' enable a securing feature 184, 184', ties or straps, to secure the rodent deterrent apparatus to the vehicle. The second attachment feature 108, a magnet, further secures the rodent deterrent apparatus 100 to the vehicle. As shown in FIG. 13, a power cord 306 provides a power source for the exemplary rodent deterrent apparatus 100. The power cord is attached to the negative terminal 302 and positive terminal 304 of the vehicle battery 300 by power cord couplers 310, 310', such as alligator clips, for example. Also shown in FIG. 13 is a wireless interface 236 comprising a wireless signal receiver 232. The wireless signal receiver receives a wireless signal 238 sent from the main housing 102. A controller may monitor the battery state of charge and/or the status of a deterrent device, such as a light and may send a wireless signal to the wireless interface, which may be place inside the cabin of the vehicle to provide an alert when maintenance or battery charging and/or replacement is required. As shown in FIG. 13, the battery indicator light 234 is red, indicating that the battery needs to be charged, for example.

The light indicator 234' is green, indicating that the light deterring device is working properly.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A rodent deterrent apparatus comprising:
   a) a strobe light;
   b) a deterrent apparatus controller comprising;
      i) a control element;
      wherein said control element is configured to selectively activate said strobe light;
   c) a main housing attached to an automobile and configured under a hood of the automobile;
      wherein said main housing is configured to retain said deterrent apparatus controller;
   d) an accelerometer operably connected to said control element that detects when the automobile is in motion,
      wherein the control element switches the rodent deterrent apparatus to a power saver mode when in motion to reduce drain on a battery power source;
      wherein the battery power source provides power to said strobe light, and said control element;
   f) a motion sensor, operably connected to said control element, that detects motion of a rodent near said main housing, and wherein the control element activates the strobe light when motion of said rodent is detected;
   g) a light sensor, operably connected to said control element, that detects an ambient light level,
      wherein the control element switches the rodent deterrent apparatus to a power saver mode when a light level above a threshold light level is detected by the light sensor and wherein the strobe light is deactivated when the light level is above a threshold light level; and
      wherein the control element reactivates the rodent deterrent apparatus in a dark environment and the light sensor detects a light level below said threshold light level, wherein the control element activates the strobe light when the motion sensor detects motion.

2. The rodent deterrent apparatus of claim 1, wherein the rodent deterrent apparatus is electrically coupled with a battery of the automobile.

3. The rodent deterrent apparatus of claim 1, further comprising a strobe light setting feature configured to change the wavelength of the strobe light.

4. The rodent deterrent apparatus of claim 1, further comprising a strobe light setting feature configured to change the intensity of the strobe light.

5. The rodent deterrent apparatus of claim 1, further comprising a strobe light setting feature configured to change the pulse interval of the strobe light.

6. The rodent deterrent apparatus of claim 1, further comprising a scent deterrent that emits a scent to deter rodents.

7. The rodent deterrent apparatus of claim 6, wherein the scent deterrent comprises a scent reservoir and a heating element to activate release of the scent.

8. The rodent deterrent apparatus of claim 6, wherein the motion sensor, operably connected to said control element, detects motion of a rodents near said main housing, and wherein the control element activates the scent deterrent when motion of said rodent is detected.

9. The rodent deterrent apparatus of claim 1, further comprising an ultrasonic wave emitter.

10. The rodent deterrent apparatus of claim 9, wherein the motion sensor, operably connected to said control element, detects motion of a rodents near said main housing, and wherein the control element activates the ultrasonic wave emitter when motion of said rodent is detected.

11. The rodent deterrent apparatus of claim 1, further comprising wireless signal transmitter that is operably coupled with the controller; and a wireless interface comprising:
   a) a wireless signal receiver;
   b) an indicator light;
   wherein the wireless signal receiver receives a wireless signal sent by the wireless
signal transmitter and changes the indicator light as a function of the wireless signal.

12. The rodent deterrent apparatus of claim 1, wherein said rodent deterrent apparatus further comprises one or more attachment features attached to said main housing.

13. The rodent deterrent apparatus of claim 12, wherein said one or more attachment features comprises a magnet.

14. The rodent deterrent apparatus of claim 1, wherein said light source is a strobe light comprises a light-emitting diode (LED) light.

15. The rodent deterrent apparatus of claim 1, wherein said main housing is sealed to protect said deterrent apparatus controller from external elements.

16. The rodent deterrent apparatus of claim 1,
   wherein the strobe light has a pulse interval of between 0.1 and 5 seconds; and
   further comprising a strobe light setting feature configured to change the pulse interval of the strobe light;
   wherein the rodent deterrent apparatus is electrically coupled with a battery of the automobile.

17. The rodent deterrent apparatus of claim 16, further comprising:
   a) a sound deterrent that emits an ultrasonic sound.

18. The rodent deterrent apparatus of claim 17, wherein the control element switches the sound deterrent on when the motion detector detects motion.

19. The rodent deterrent apparatus of claim 17, further comprising:
   a) a scent deterrent that emits a deterring scent comprising:
      i) a scent element;
      ii) a scent reservoir;
      iii) a scent heating element; and
      iv) a scent outlet;
      wherein the scent element is configured in the scent reservoir and the scent heating element heats the scent element within the scent reservoir to release a deterring scent through the scent outlet in the main housing.

* * * * *